United States Patent [19]

Konkle

[11] 4,281,852
[45] Aug. 4, 1981

[54] MOTION CONVERTING SYSTEM

[76] Inventor: Raymond L. Konkle, 409 N. Tenth St., Clinton, Iowa 52732

[21] Appl. No.: 33,327

[22] Filed: Apr. 25, 1979

Related U.S. Application Data

[63] Continuation-in-part of Ser. No. 883,434, Sep. 15, 1977, abandoned.

[51] Int. Cl.³ .............................................. B60S 9/12
[52] U.S. Cl. ..................................... 280/766; 74/129; 91/306; 254/86 H
[58] Field of Search ................... 280/766, 764, 43.23; 91/306; 254/86 R, 86 H; 74/34, 47, 126, 129, 142, 143, 149, 157; 296/37.2

[56] References Cited

U.S. PATENT DOCUMENTS

| | | | |
|---|---|---|---|
| 659,079 | 10/1900 | Lieb | 74/129 |
| 853,154 | 5/1907 | Bluebaum | 74/126 |
| 1,291,642 | 1/1919 | Elwell | 74/126 |
| 2,458,716 | 1/1949 | Marendaz | 74/126 |
| 2,525,929 | 10/1950 | Meder | 74/34 |
| 3,094,902 | 6/1963 | Riopelle | 91/306 |
| 3,201,087 | 8/1965 | Dalton | 280/766 |
| 3,212,406 | 10/1965 | McDuffie | 91/306 |
| 3,282,167 | 11/1966 | McKenzie | 91/306 |
| 3,698,253 | 10/1972 | Koeber | 74/129 |
| 3,861,648 | 1/1975 | Glassmeyer | 280/766 |
| 3,912,099 | 10/1975 | Liebermann | 296/37.2 |
| 3,963,383 | 6/1976 | Hill | 91/306 |
| 4,116,315 | 9/1978 | Vandenberg | 280/766 |

FOREIGN PATENT DOCUMENTS 706288 3/1965 Canada .................................. 280/766

Primary Examiner—David M. Mitchell
Attorney, Agent, or Firm—Kalish & Gilster

[57] ABSTRACT

A motion converting system is configured for operating a vehicular jacking mechanism having a jacking member and a shaft rotatable for actuating the jacking member. The system comprises a sleeve for receiving the shaft which is then coupled to the sleeve, as through a transmission. The system includes a pneumatic cylinder. An actuator rod extends from the cylinder axially normal to the sleeve and is reciprocal toward and away from the sleeve, which carries a toothed wheel. Lever arms, arranged in pairs on opposite faces of the toothed wheel, extend radially outward from the sleeve and have proximal ends swingable about the sleeve. Pairs of links respectively interconnect distal ends of the lever arms with the end of the actuator. Selectively reversible pawls carried between pairs of the lever arms engage teeth of the toothed wheel to cause rotation of the sleeve for rotating the shaft in a selected continuous direction upon each movement of the actuator rod.

9 Claims, 20 Drawing Figures

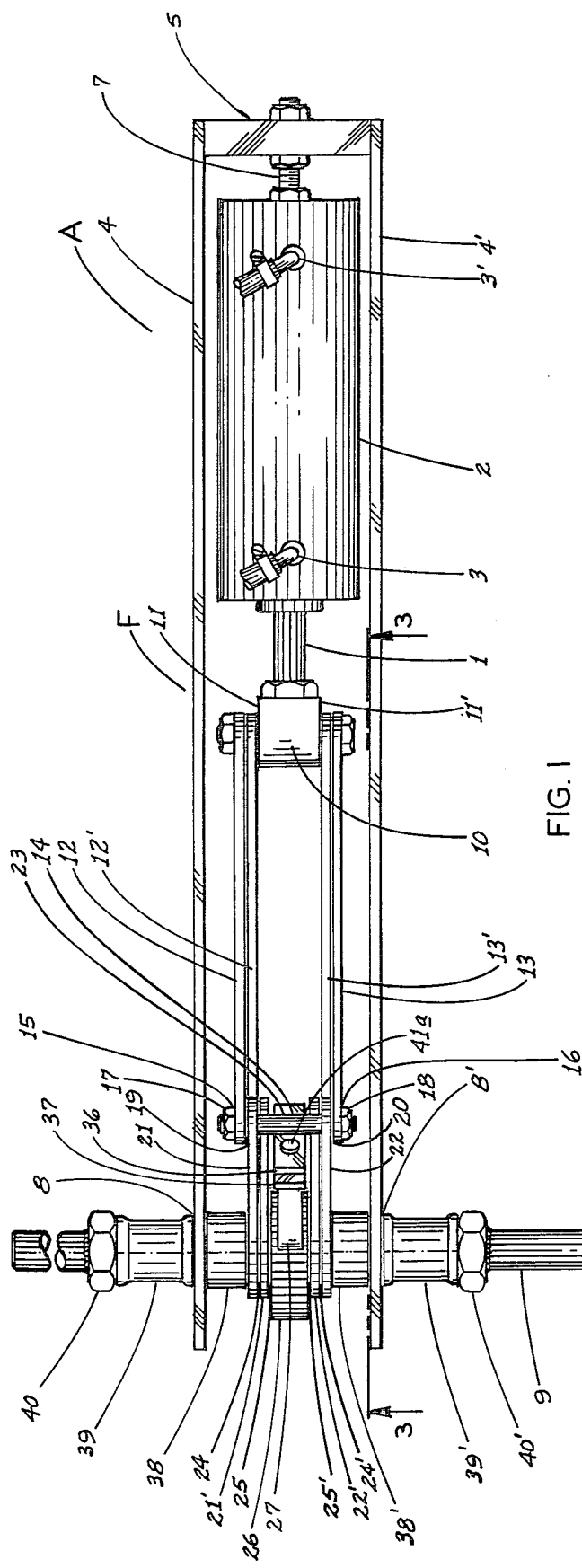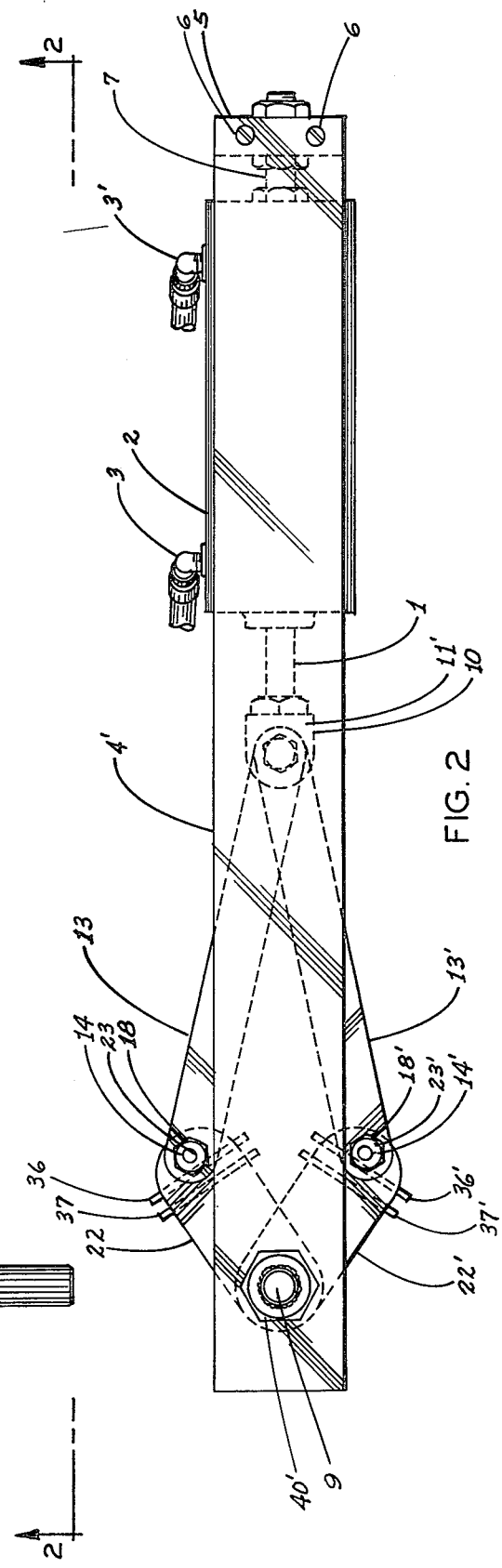

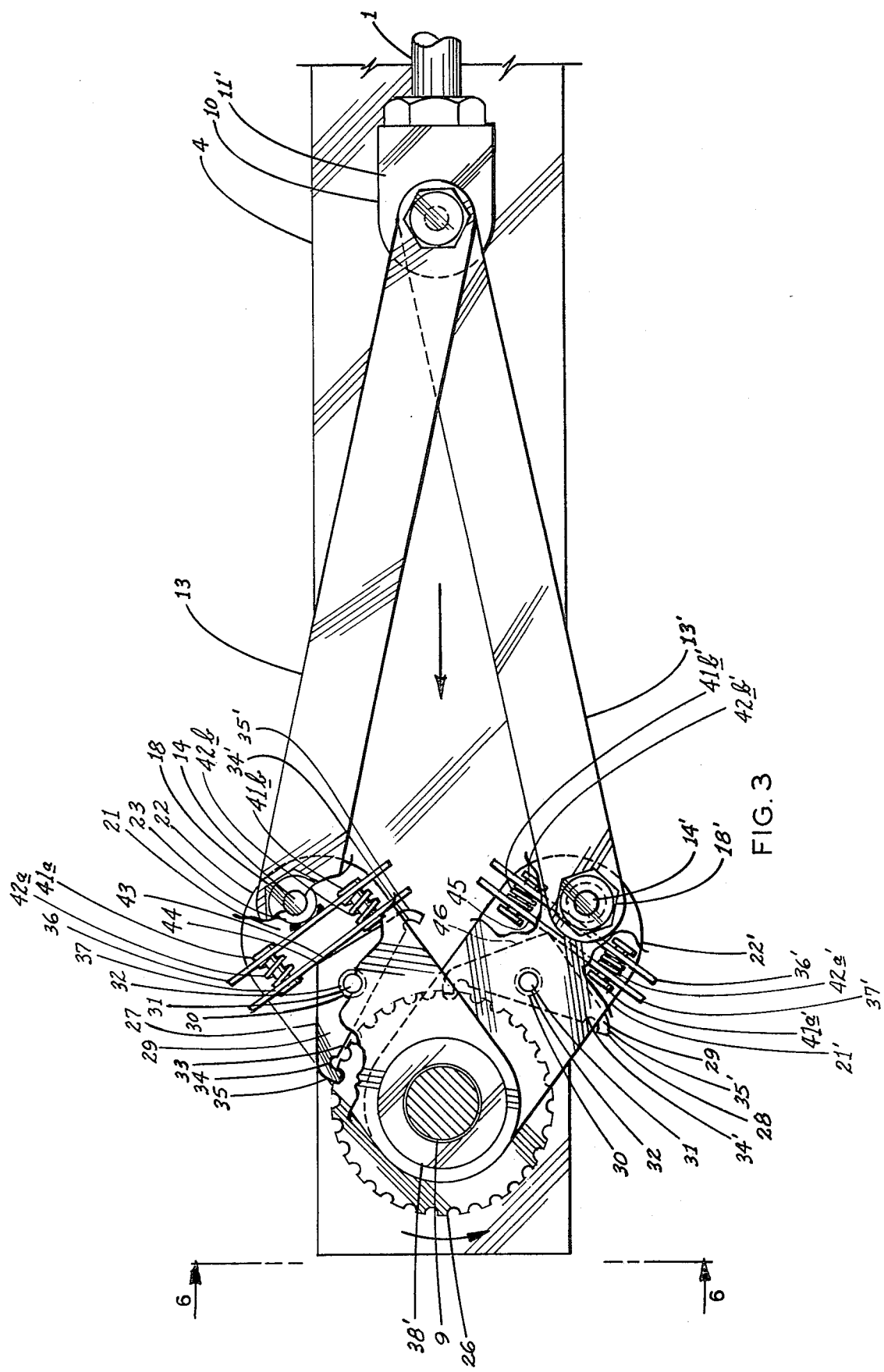

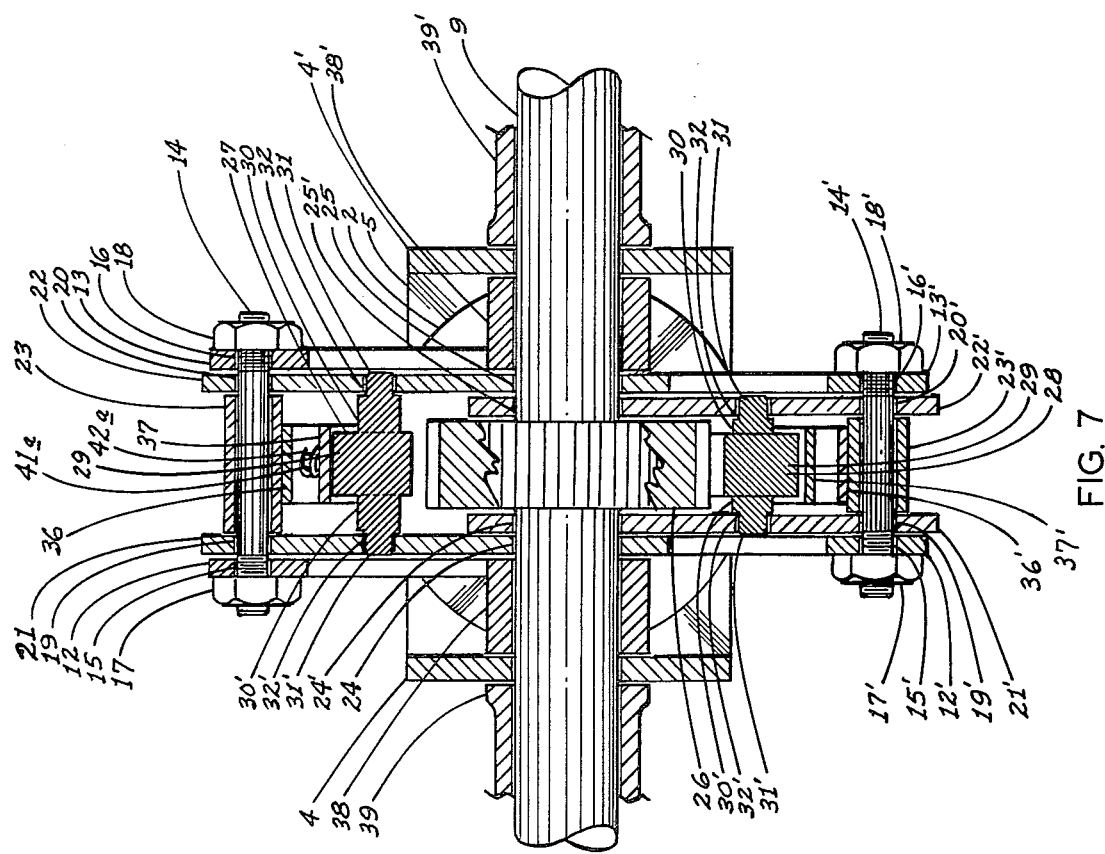
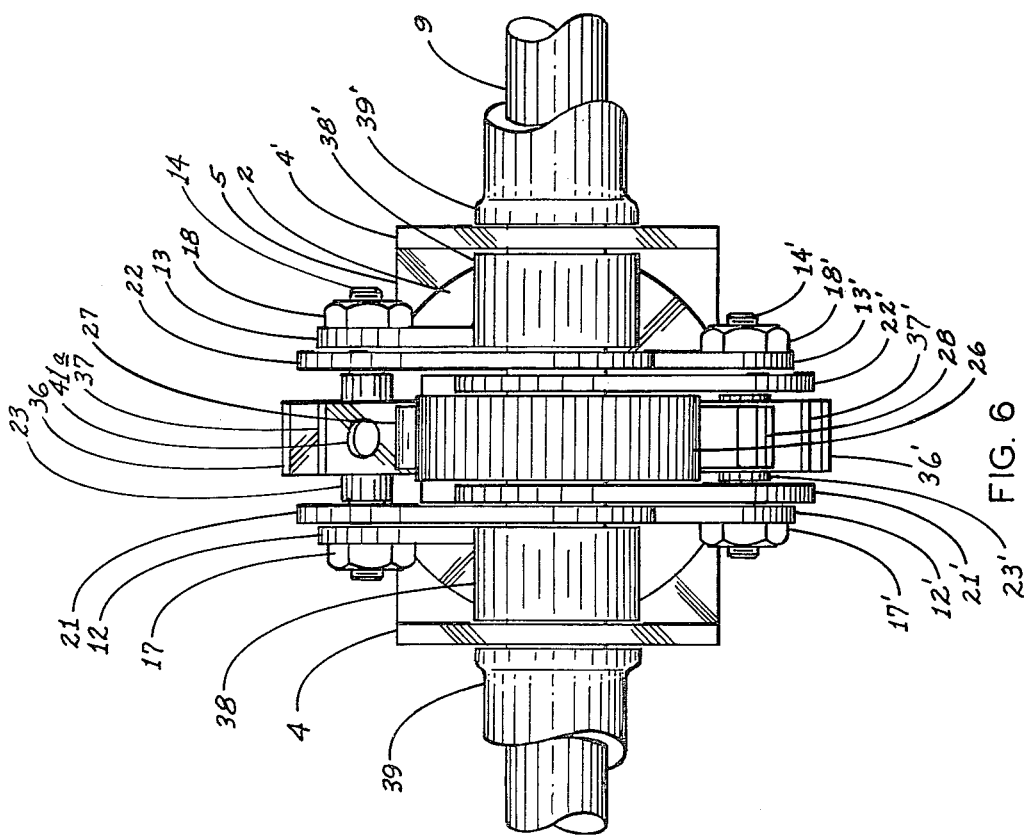

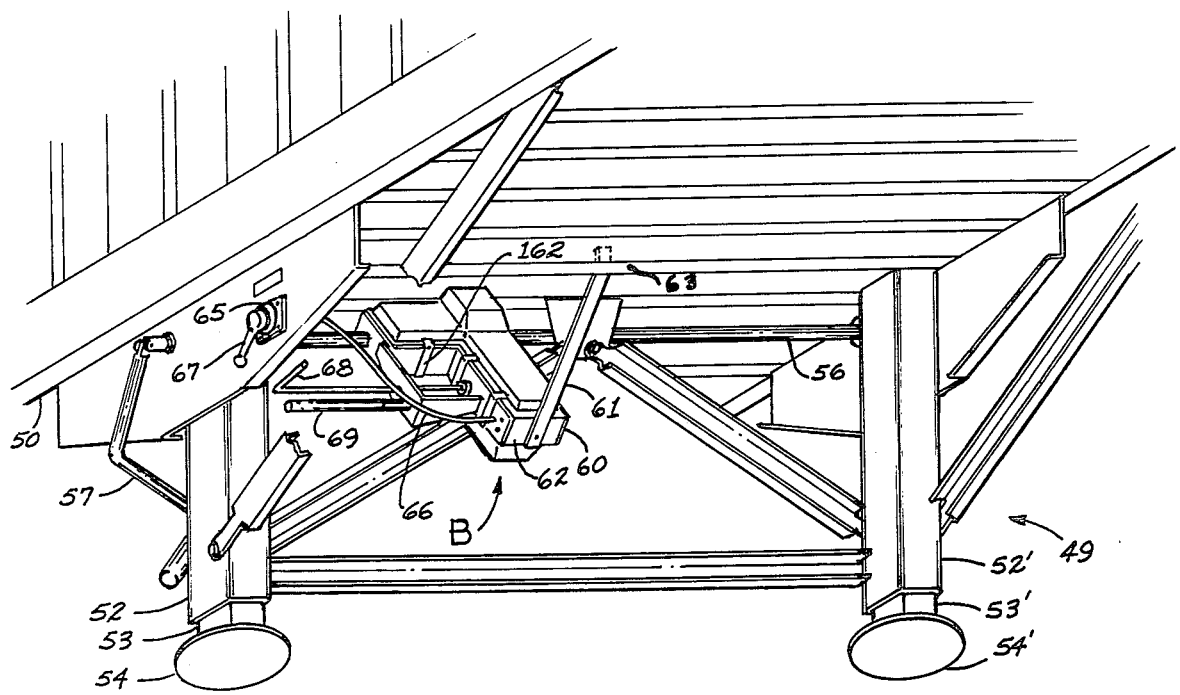
FIG. 8
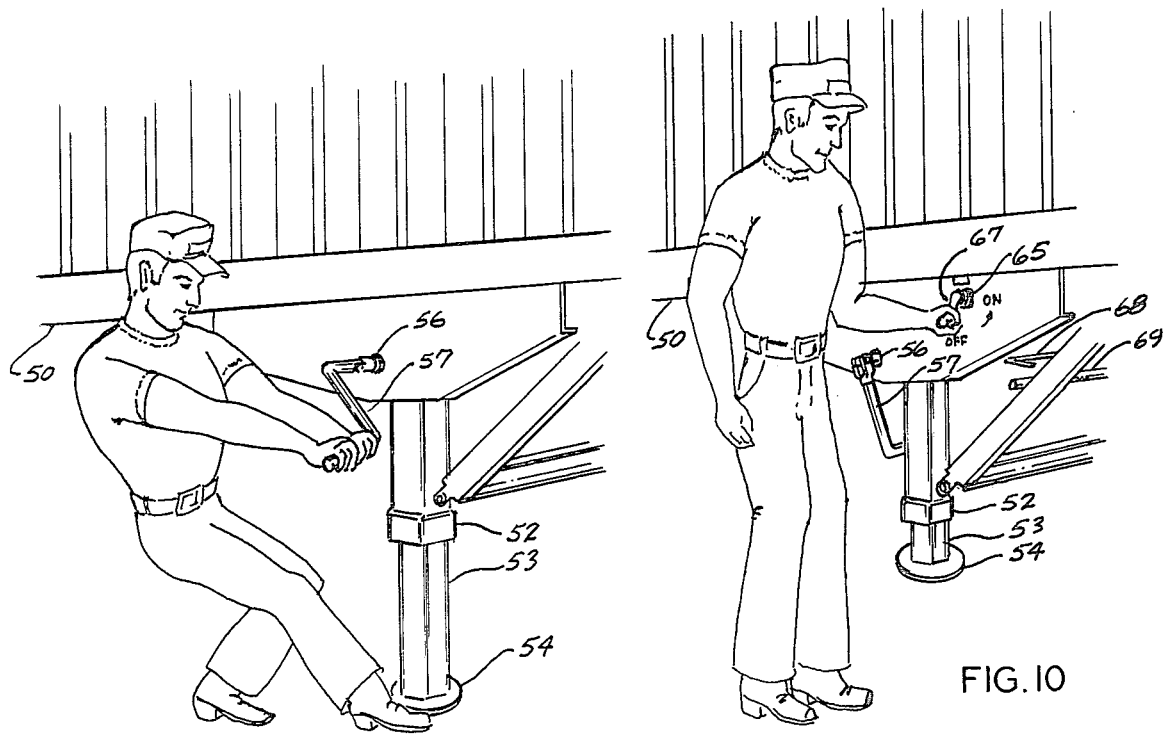
FIG. 9 PRIOR ART
FIG. 10

MOTION CONVERTING SYSTEM

CROSS-REFERENCE TO RELATED APPLICATION

This application is a continuation-in-part of the application of Raymond L. Konkle, Ser. No. 883,434, filed Sept. 15, 1977, for Motion Converting System and now abandoned.

BACKGROUND AND SUMMARY OF THE INVENTION

This invention relates in general to motion transmission and particularly to a system for converting rectilinear motion to continuous rotary motion for actuating a truck trailer landing gear apparatus.

It has long been known to equip truck trailers with so-called landing gear mechanisms having a pair of landing gear legs adapted to be extended by rotation of a transverse shaft or so-called cross shaft having a crank at one end. Thus, the landing gear legs can be lowered or extended by manually rotating the crank to lift the front of the trailer, as for disconnection from a truck tractor. The weight of a fully loaded trailer on the landing gear legs typically may exceed 30,000 lbs. Turning the crank by hand may require as much as about 100 lbs. of manual force on the crank handle to lift the heavily laden trailer. Moreover, it may typically take 25 turns by hand at these great forces to lift the trailer only one inch. Accordingly, this is a difficult and energy-consuming manual chore. Adverse weather conditions make the hard job of cranking even more difficult. The very high gear ratio necessitated by the landing gear mechanism to enable manually applied cranking force to lift such a great weight means that many difficult, time-consuming turns of the crank are necessary for either extending or retracting the landing gear legs. Damage to truck trailers which often results from not properly positioning the landing gear by manual operation often requires costly repairs which represent a major expenditure for truck owners. This occurs because of the frequent failure, due to high force and time required, to crank the landing gear legs completely down. Thus, when the tractor is pulled away from the trailer after having been unhitched, the front of the trailer will drop. The shock of the impact can damage the landing gear and the frame of the trailer. Later, when a tractor is backed under the trailer for hitching purposes, damage can again be done to the leading edge of the trailer and also to the tractor drive train, as well as possibly causing the trailer to be rammed or jammed against a loading dock with consequent damage to the dock, the rear of the trailer, or both.

There is disclosed in U.S. Pat. No. 4,116,315 a pneumatic landing gear actuator for making advantageous use of air pressure normally provided on truck trailers for braking purposes in order to rotate shaft extensions to each landing gear leg. Such apparatus makes use of a pneumatic actuator of the type previously known for applying actuating vehicular brakes having very limited piston rod travel. Therefore, only a most limited arcuate movement is available for each actuating stroke of the device. Additionally, such landing gear actuator imparts rotation to the landing gear shafts only upon one direction of movement of a piston rod of the pneumatic actuator, thus even more limiting the speed and effectiveness of the patented device. When such device is utilized for actuating the landing gear mechanism when the legs are not in a loaded condition, i.e., for lowering the landing gear legs several inches to the ground or raising them, the limited actuating stroke and single-acting character of the patented device result in very long actuating times with consequent high usage of air in an inefficient manner.

It is an object of the present invention to provide a motion converting system whereby reciprocal rectilinear motion may be converted to continuous rotary motion in an economic and highly efficient manner.

It is another object of the present invention to provide a motion converting system of the type stated wherein despite the direction of rectilinear travel continuous rotary motion is developed.

It is a further object of the present invention to provide a system of the character stated which requires a paucity of parts, all of which are of sturdy construction and thus resistant to breakdown and productive of reliable operation whereby said system may be most economically manufactured and which is exceedingly durable in operation, not requiring the costly services of an attendant.

It is a still further object of the present invention to provide a motion converting system of the character stated wherein the means for imparting reciprocal rectilinear motion to a rod or like member may be of any suitable type whether pneumatic, hydraulic, electro-mechanical, or the like so that extreme versatility in production is feasible.

It is another object of the present invention to provide a motion converting system of the character stated incorporating a novel linkage system between the rectilinearly moving system and a driven shaft for effecting operation of an unusual and novel double ratchet arrangement for cooperation with a toothed wheel alternatively drivenly engageable with said ratchets responsive to the direction of travel of the rectilinearly movable members.

It is a further object of the present invention to provide a motion converting system of the type stated for operating a vehicular jacking mechanism having a shaft which is rotatable for actuating a jacking member.

It is a still further object of the present invention to provide such a motion converting system for operating a truck trailer landing gear mechanism.

It is another object of the present invention to provide such a motion converting system for operating a truck trailer landing gear mechanism with high efficiency, with speed, and in a manner which is easily controlled, with motive power being provided by the conventional vehicular air source such as braking air pressure.

It is still another object of the present invention to provide such motion converting system which is easily installed upon a truck trailer for operating a conventional crank-type landing gear mechanism by causing rotation of a so-called cross shaft of the mechanism normally turned by hand cranking, a related object of the invention being to provide such a motion converting system which is fitted on such cross shaft with the shaft intact for suspending the system beneath a truck trailer.

A further object of the present invention is to provide such a motion converting system for operating a landing gear mechanism at a selected mechanical ratio for extra high speed movement of the landing gear legs under lightly loaded or unloaded conditions.

Among other objects of the present invention may be noted the provision of such a motion converting system for operating a landing gear mechanism which is relatively lightweight, which is installed very quickly and easily, which is low in cost, reliable in use, which develops high torque with low air consumption, which operates from minimum air pressure, and which provides sufficient actuating power to lift even a fully loaded trailer with high speed, and which permits manual operation of the landing gear mechanism.

Other objects will be in part apparent and in part pointed out hereinafter.

DESCRIPTION OF THE DRAWINGS

FIG. 1 is a top plan view of a motion converting system constructed in accordance with and embodying the present invention.

FIG. 2 is a side elevational view taken on the line 2—2 of FIG. 1.

FIG. 3 is an enlarged, fragmentary side elevational view, in partial section, taken on the line 3—3 of FIG. 1, illustrating the rod in retracted condition.

FIG. 6 is an end view taken on the line 6—6 of FIG. 3.

FIG. 7 is a vertical transverse sectional view taken on the line 7—7 of FIG. 4.

FIG. 8 is a perspective view of the under side of a truck trailer, a landing gear mechanism of such trailer, and a motion converting system constructed in accordance with and embodying the present invention with a unit of the system being supported below the trailer floor and interconnected with the landing gear mechanism for operating the same.

FIG. 9 is a pictorial illustration of hand cranking for the purpose of raising or lowering landing gear legs of the landing gear mechanism.

FIG. 10 is a similar pictorial illustration of controls and the manner of using the same for controlling the motion converting system of the present invention to cause actuation of the landing gear mechanism.

FIG. 19 is a vertical longitudinal sectional view of a certain shaft coupling sleeve mechanism taken along line 19—19 of FIG. 11.

Corresponding reference characters indicate corresponding parts throughout the several views of the drawings.

DESCRIPTION OF THE PREFERRED EMBODIMENT

Figure 4:
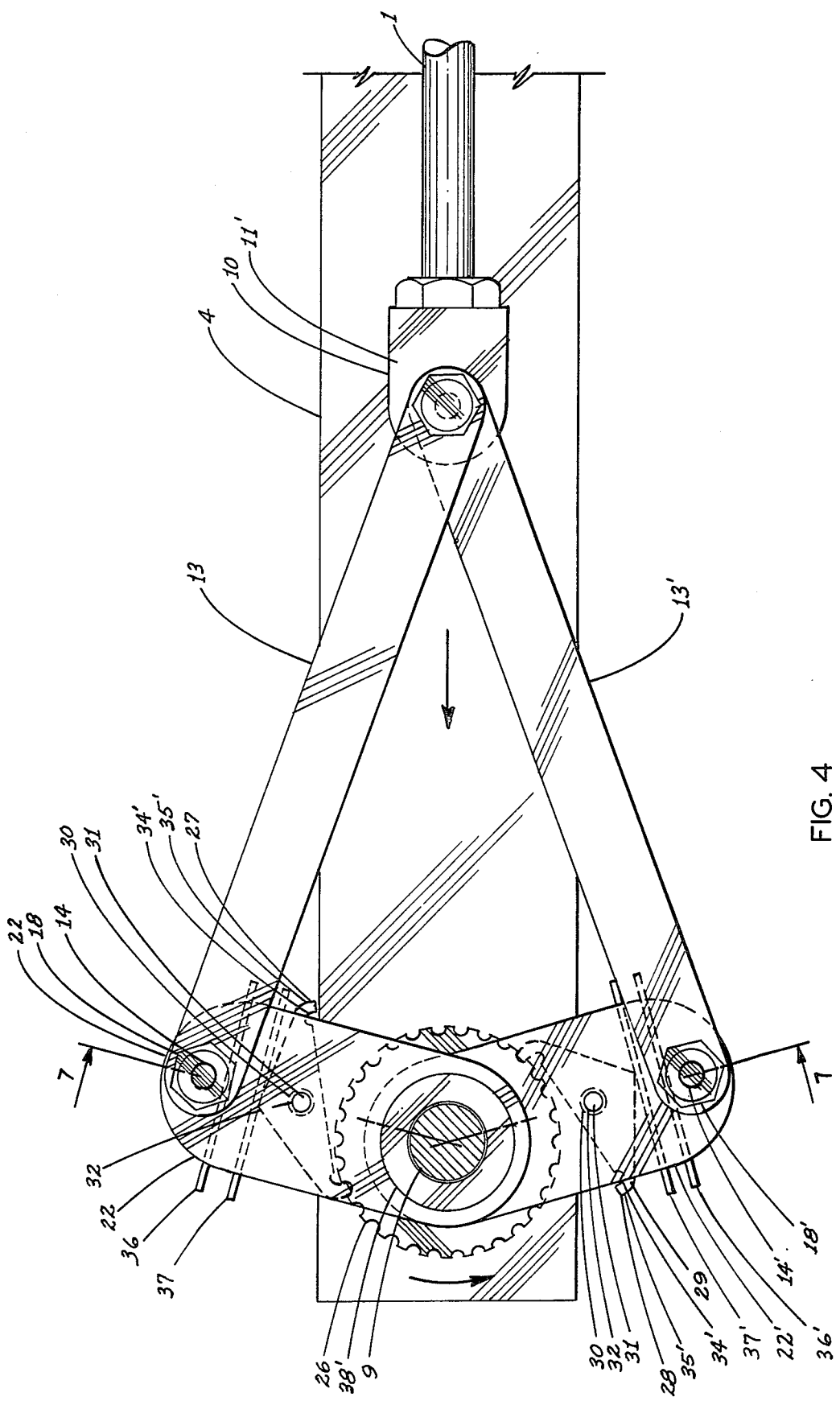
FIG. 4 is a side elevational view taken substantially on the line 3—3 of FIG. 1, illustrating the rod in substantially fully extended condition.

Referring now by reference characters to the drawings which illustrate the preferred embodiment of the present invention, A generally designates a motion converting system designed to effect a conversion of reciprocal rectilinear motion into continuous rotary motion.

System A comprises a rod 1 adapted for reciprocating rectilinear motion as within a plane horizontal to the support surface or floor, as the case may be, and with such motion being effected by any suitable means, such as, for example, pneumatic, hydraulic, electro-mechanical, etc. But, for purposes of illustration only, rod 1 is operatively engaged to a pneumatic cylinder 2. Internally of said cylinder 2 rod 1 is engaged to a conventional piston (not shown) for operation against opposite faces thereof of compressed air introduced into said cylinder alternatively through the customary ports 3,3' which are connected to a source of compressed air and adapted for introduction and withdrawal of the same from cylinder 2 in the usual manner so that axial reciprocal movement of rod 1 may be effected at a desirably constant rate.

Cylinder 2 is mounted within a generally elongated U-shaped frame F embodying narrow parallel side components 4,4' which at their normally rearward end are interconnected by a cross piece 5, as through screws 6 or other fastening means. Cylinder 2 at its end proximate cross piece 5 is fixed thereto, as by a bolt 7, for maintenance in selected operative condition. At their other, or cross piece remote ends, said side components 4,4' are provided with transversely aligned openings 8,8', respectively, to define bearings for journalling of a drive shaft 9 projecting therethrough and extending at its ends beyond said side components 4,4'; the longitudinal axis of shaft 9 being perpendicular to that of rod 1 and being substantially planar aligned therewith. At its outer or cylinder-remote end rod 1 carries at its end a connecting block 10 having flat side faces, as at 11,11', at each of which is pivotally mounted, in their rearward ends, a pair of upper and lower links 12,12', respectively, and 13,13', respectively. The links of each pair lie within immediately parallel planes and, as will be shown, by reason of their swingable mounting, the links of each of said pairs 12,12' and 13,13' are adapted to move convergingly toward, and divergingly away from, each other. At their other or normally forward ends upper links 12,13 are interengaged by securement to opposite ends of a cross pin 14 which extend through aligned openings 15,16 formed in said links 12,13, respectively, and with the projecting ends of said pin 14 being threaded for securement to retaining nuts 17,18. Said cross pin 14 also extends through apertures 19,20 formed in the upper ends of relatively short lever arms 21,22 which are located respectively immediately inwardly of links 12,13, respectively. Disposed encirclingly of cross pin 14 between lever arms 21,22 is a spacer 23 thereby maintaining the spacing between said retaining nuts 17 and the links 12,13 in appropriate adjacency for mutual relative pivotal action. During reciprocal travel of rod 1 said lever arms 21,22 at their opposite or normally lower ends are swingably engaged upon shaft 9 by means of enlarged openings 24,25, respectively.

Lower links 12',13' at their forward ends are similarly engaged as upper links 12,13 in that they are suitably connected to a cross pin 14' extending through openings 15',16' respectively provided in said links 12',13' and with nuts 17', 18' snugly engaged upon the threaded projecting ends of said cross pin 14'. Said cross pin 14' also extends through apertures 19',20' formed in the outer ends of relatively short lever arms 21',22' which are in all respects similar to lever arms 21,22 above described and with there being a spacer 23' encircling cross pin 14' between said lever arms 21',22' for providing spacing between the retaining nuts 17', 18' and thus maintaining same in appropriate relationship to the above-described lever arms 21,22 and link pairs. The opposite ends of lever arms 21',22' are swingably engaged upon shaft 9 as through relatively enlarged openings 24',25'. Therefore, in view of the foregoing it is apparent that as links 12,12',13,13' are pulled by rod 1 during its retracting movement and pushed during the cylinder-extending action of rod 1, said lever arms 21,21' and 22,22' are correspondingly rocked about their mounting on shaft 9; as with the same being pulled generally rearwardly or in the direction of cylinder 2 during rod retraction and being pushed forwardly or away from said cylinder 2 during rod extending action. Thus, the link-lever arm arrangement compensate for the travel of rod 1 toward and away from the fixed axis of shaft 9.

Suitably mounted upon shaft 9 between the innermost pair of lever arms 21',22' is a toothed or ratchet wheel 26; said mounting being such as to fix wheel 26 for rotation with shaft 9 as being integral therewith, keyed, or otherwise rigidly secured. Provided between the upper and lower pairs of lever arms 21,22 and 21',22', respectively, are upper and lower pawls 27,28, each of which is of like construction so that for purposes of simplification description will be restricted to upper pawl 27. Pawl 27 comprises a central body 29 of general triangular configuration with integral arm-like projections 30,30' projecting from opposite sides thereof and having slightly turned-down pinion forming ends 31,31' for journalling within openings 32,32', respectively, provided within lever arms 21,22, respectively, permitting said pawl 27 to be rockable about the axis developed by said arms 30,30'. Said pawl 27 contains a flat base surface 33 at each end of which is a relatively shallow recess 34,34' the outer or end limit of which is determined by a finger 35,35' shaped for extension into the interdental zones developed by the teeth of ratchet 26. Thus, pawl 27 is separately engageable at its opposite ends with ratchet 26 depending upon the particular relative position of rod 1 as will be more evident hereinbelow.

Securely mounted to the cross-pin 14 and sleeve 23 assembly as by a weld or the like is a flat stiff strip 36. Spaced from and loosely secured to strip 36 by rivethead pins 41a and 41b is a second flat stiff strip 37. The latter pins also retain corresponding compression spring 42a and 42b between the strips 36 and 37 so as to resiliently urge strip 37 away from strip 36 in a direction toward pawl 27 and thereby forming a spring-loaded pad constituted by a surface 43 of strip 37 for engaging a shoulder 44 of pawl 27.

Similarly mounted to the cross-pin 14' and sleeve 23' assembly is a strip 36', there being another strip 37' spaced from and loosely secured to strip 36' by pins 41a and 41b retaining compression springs 42a' and 42b' between these strips so as to resiliently urge strip 37' away from strip 36' in a direction toward pawl 28 so as to cause a surface 45 serving as a spring pad to bear against a shoulder 46 of pawl 28.

Hence, pawls 27,28 will remain in either of two positions by virtue of the respective spring pad surfaces 43,45 which bear against corresponding shoulders 44,46 and keep the pawls 27,28 engaged with ratchet 26. Thus, when movement of lever arms 21, 22 is in a work-performing direction, one of pawls 27,28 is engaged with ratchet 26 for rotating the same in one direction while the other of the pawls overrides the toothed surface of ratchet 26. When movement of the lever arms is in the reverse direction, the other of the pawls is engaged with ratchet 26 for continuing rotation in the same direction. For reversal of the direction of ratchet 26, each of pawls 27,28 is positioned by overcentering movement either manually or by other means. Hence, by selective overcentering of both pawls 27,28 the direction of continuous rotation of the ratchet selectively may be reversed.

In order to maintain ratchet 26 in centered relationship between side components 4,4', spacer elements 38,38' are disposed upon shaft 9 between side component 4, and upper lever arm 21 and side component 4' and lever arm 22, respectively, said last mentioned lever arm being located laterally outwardly of lower arms 21', 22'. Immediately exterior of side components 4,4' shaft 9 also mounts spacers 39,39', respectively, which are held against axial movement by nuts 40, 40' rigid on shaft 9.

From the foregoing it will readily be seen that the power provided rod 1 by operation of pneumatic cylinder 2 will be utilized for effecting rotation of shaft 9. With rod 1 moving reciprocally in a rectilinear path axially normal to shaft 9, the motion of said rod 1 through the linkage-lever arm-pawl-ratchet arrangement will be converted to continuous rotary motion so that as long as rod 1 is being caused to reciprocate axially shaft 9 will be rotated continuously and in a single direction.

Although it is believed that the foregoing, together with the drawings, will clearly manifest the operation of the present invention, it will be seen that with rod 1 in substantially fully retracted condition, that is, at the limit of its travel toward cylinder 2, links 12,12', 13,13' will have caused lever arms 21,22 and 21',22' to have been pulled toward cylinder 2 so that the angle formed by said links and the adjacent lever arms will be at a maximum. In this state, as shown in more detail in FIG. 3, it will be seen that upper pawl 27 will engage ratchet 26 by its finger 35, while the corresponding finger 35' of lower pawl 28 will be lightly received in a confronting interdental zone on ratchet 26. As rod 1 is caused to move away from cylinder 2 on what may be considered its driving stroke, as suggested by the arrows in FIGS. 3 and 4, a pushing by links 12,12', 13,13' is caused, causing consequent rocking of lever arms 21,22, 21',22' so that the shaft remote ends thereof are swung in a direction away from cylinder 2. Such movement will cause finger 35 of upper pawl 27 to be firmly retained within the engaged interdental zone of ratchet 26 and thereby cause rotation to be imparted thereto (see arrows in FIGS. 3 and 4) as a pushing action is imparted to said ratchet wheel 26. The corresponding finger 35 of lower pawl 28 will move away from engagement with the interdental zones of ratchet 26 so that the same merely "rides" freely thereby without contributing to the movement of said ratchet 26. Accordingly, in view of the foregoing, it is apparent that upon the expanding or driving stroke of rod 1, shaft 9 will be caused to rotate in a counterclockwise direction as viewed in FIGS. 3 and 4 by reason of the driving of ratchet 26 by finger 35 of pawl 27 as a result of the motion transmission through the aforesaid links and lever arms.

Figure 5:
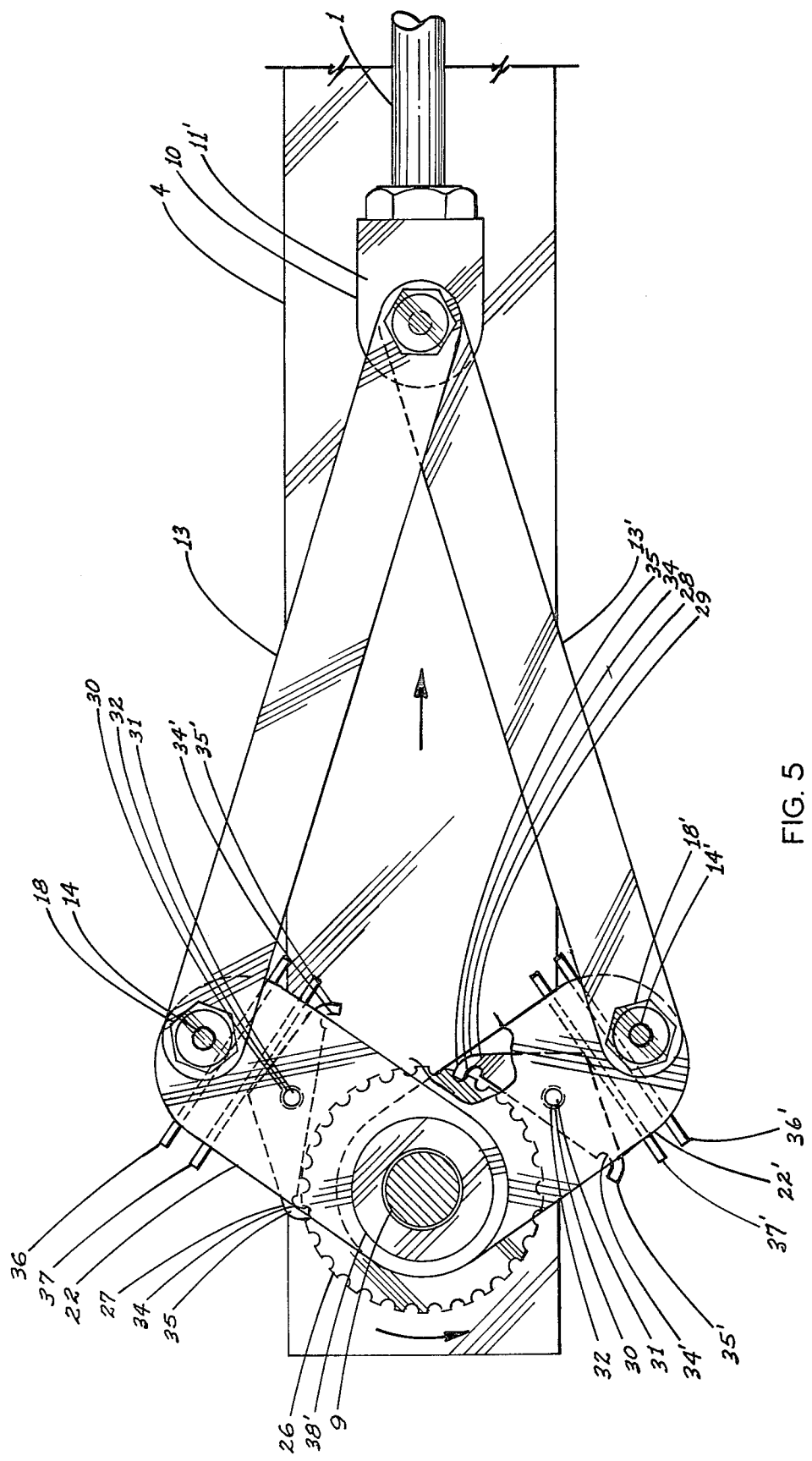
FIG. 5 is a side elevational view taken substantially on the line 3—3 of FIG. 1, illustrating the rod in the course of its retractive movement.

Conversely, upon the retracting or withdrawing movement of rod 1 (see FIG. 5) finger 35 of lower pawl 28 will be snugly engaged within the confronting interdental zone of ratchet 26 so as to impart movement to the latter and, hence, so shaft 9 as said links and lever arms are pulled in a direction toward cylinder 2. In this condition upper pawl 27 "rides" along ratchet 26 without motion transmission thereto. It will thus be seen that system A as described will cause shaft 9 to be continuously rotated in the same direction regardless of the particular direction of travel of rod 1.

From the foregoing it is quite evident that system A is indeed novel and comprises a simplicity of parts for reliably effecting a continuing conversion of rectilinear motion to continuous rotary motion of a unidirectional type. The present invention thus accomplishes the unidirectional rotation of the shaft by the novel double ratchet arrangement so that regardless of whether the rod is in its pushing or pulling stage, rotation is being effected. It has long been known that rotating motion has been obtained from linear motion by use of a single ratchet which thus requires a delay on return travel of the driving rod. The single pawl arrangement thus clearly consumes twice the amount of air as the present invention.

The present invention has a multitude of applications such as, for instance, to power the crank type landing gear on a semi-trailer and wherein the motivating fluid, namely the compressed air, could be supplied from the airbrake system on the tractor. Other applications would be in the fields of hoists, overhead cranes, conveyors, etc., since the concept of converting linear motion to continuous rotary motion has excessively wide acceptance in numerous industrial fields.

CONTINUATION-IN-PART

Referring to FIGS. 8–20, there is illustrated apparatus comprising a motion converting or transmission system as configured for operating a truck trailer landing gear mechanism 49 of the type carried at the underside of a truck trailer 50. Said landing gear mechanism, which is entirely conventional and typical, comprises a pair of transversely spaced landing gear leg assemblies 52,52' having corresponding landing gear legs 53,53', each having a respective foot 54,54'. Legs 53,53', which are adapted to be extended or retracted by rotation of a transverse or so-called cross shaft 56, which extends between assemblies 52,52' and which has attached to one end a crank handle 57 for manual rotation of the shaft, which is adapted to be turned by hand. Thus, the landing gear legs 53,53' are adapted to be extended from assemblies 52,52' as illustrated in FIG. 9 with each of the feet 54,54' of the legs lifting the front of the trailer for supporting the trailer in conjunction with the trailer rear wheels (not shown) when the trailer is unhitched, i.e., not coupled, to a truck tractor. Typically, a loaded trailer may weigh as much as 44,000 pounds or more. Accordingly, on the landing gear legs 53,53' there may be as much as 30,000 pounds or so of weight when the trailer is heavily laden. To provide requisite mechanical advantage, cross shaft 56 may require 25 turns by hand in the manner depicted in FIG. 9 to move each landing gear leg one inch, either for extension or retraction.

Apparatus of the present invention is configured as a compact unit designated generally B including an enclosure 60. The unit is adapted for being simply slipped on cross shaft 56 and pinned to the shaft, all as more fully described hereinbelow, and then fixed in position by means of a support bracket 61 which attaches to a shaft remote rear portion 62 of enclosure 60 and is secured at its upper extremity to one of the cross members 63 of the floor structure of trailer 50.

For operation, unit B is adapted to be provided with air under pressure, as by connection to the emergency brake air line of the vehicle. The air is controlled by an on-off valve 65 which is interconnected with the unit by a flexible conduit 66. Valve 65 includes an operating handle 67 which may be positioned as shown in FIG. 10 for supplying the air pressure to unit B for operation thereof. The unit then causes rotation of cross shaft 56 in the desired direction depending upon the position of a control lever 68 extending from unit 60 to the side of the trailer. Rotation may be either a high or a normal operating speed determined by the position of a transmission shifting lever 69 which also extends outwardly to the side of the trailer for ready manipulation, as well seen in FIG. 10. Enclosure 60 may be configured horizontally or vertically, or tipped, as shown in FIG. 8; its weight being supported primarily by cross shaft 56 with the other end having but a single point of attachment provided by bracket 61 to the trailer structure.

Figure 11:
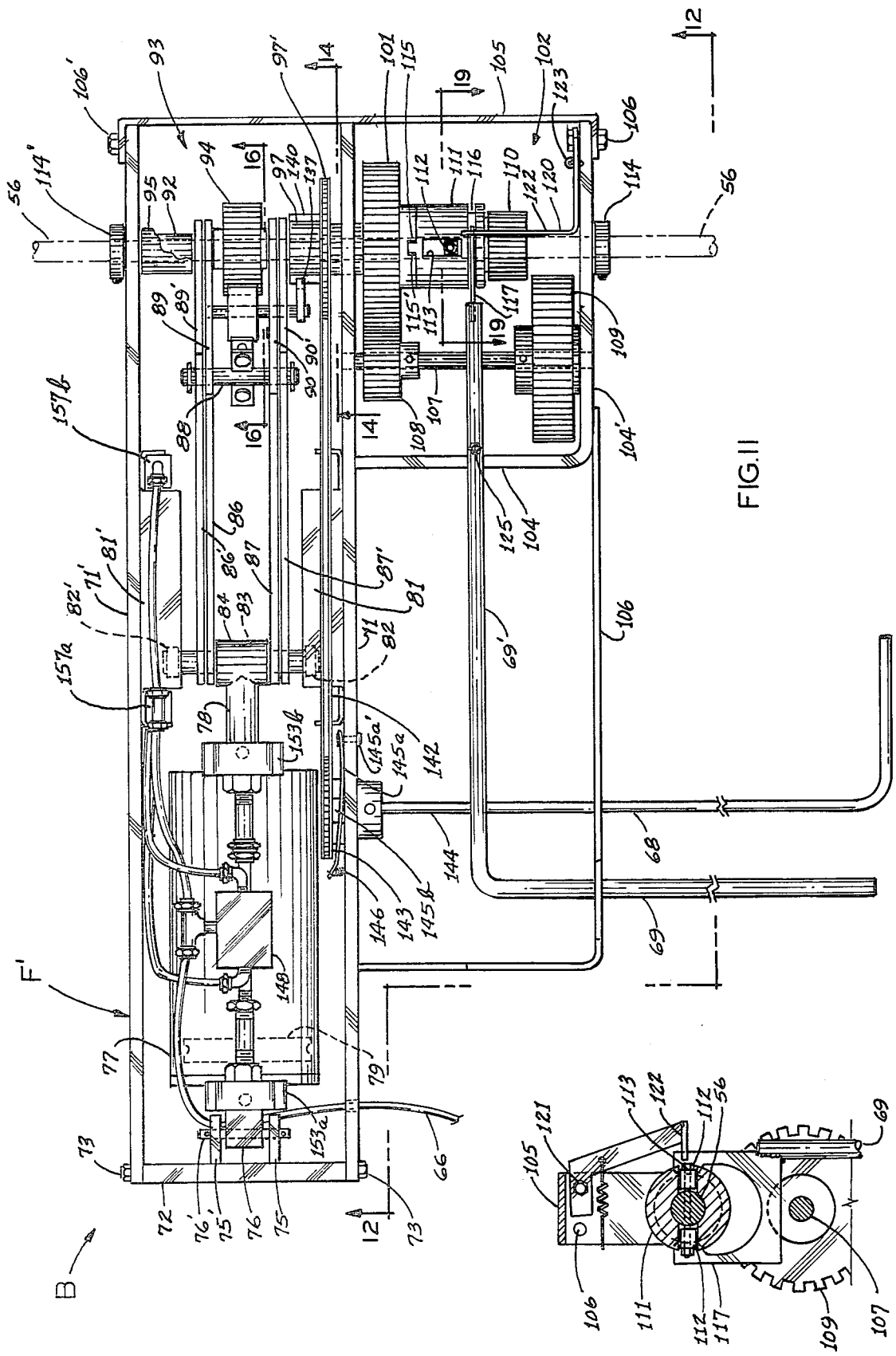
FIG. 11 is a top plan view of apparatus of a motion converting system constructed in accordance with and embodying the present invention as configured for actuating a landing gear mechanism, a cover of the apparatus having been removed.
Figure 12:
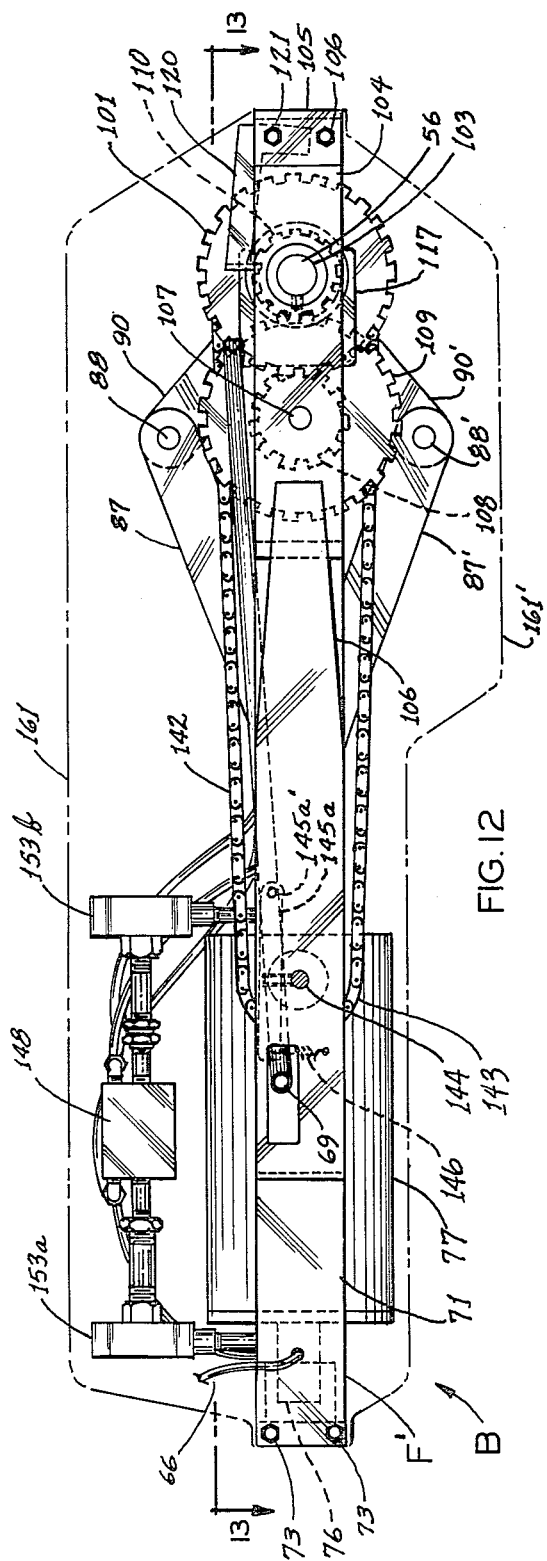
FIG. 12 is a side elevational view of the apparatus taken generally along line 12—12 of FIG. 11.

Referring now to FIGS. 11 and 12, apparatus B of the invention is seen to include a frame designated F', which is of generally U-shape and having a parallel pair of side rails 71,71' joined at their rearward end by cross member 72 to which rails 71,71' are affixed as by screws 73, or other fastening means. Extending inwardly from cross member 72 are a pair of mounting brackets 75,75' for receiving an end extension 76 of a pneumatic cylinder 77, which extension is secured to brackets 75,75' by a mounting pin 76'.

Pneumatic cylinder 77 has extending from its other end an actuating rod 78 connected to a piston 79 within the cylinder and with the actuator rod extending from the forward end of the cylinder between frame members 71,71' with the actuator rod being reciprocal in and out of the cylinder along a rectilinear path. Such path is defined by pairs of guides 81,81' on opposite inner faces of side rails 71,71' which receive rollers 82,82' carried at opposite ends of a rod end pin 83 carried transversely within a T-configured end 84 of the actuating rod 78. Thus, the hydraulic cylinder is supported pivotally at one end from pin 76' extending through cylinder end extension 76 and, at the other end, by guides 81,81'. These guides may simply be pairs of parallel plates welded to the inner surfaces of side rails 71,71' in channel-defining configuration. Reciprocation of actuator rod 78 results from the supply of air under pressure to pneumatic cylinder 77 in a manner explained hereinbelow.

Journalled on opposite sides of actuator rod end 84 upon rod end pin 83 are pairs of upper and lower links 86,86' and 87,87'. The links of each pair lie within immediately parallel planes with the links of each of said pairs 86,86' and 87,87' being adapted to move convergingly toward, and divergingly away from each other. At their forward ends, upper links 86,87 are engaged by pivotal securement by means of an upper cross pin 88 to the distal ends of a corresponding pair of upper lever arms 89,90 which have proximal ends journalled about sleeve portions of a central sleeve means 92 of a sleeve assembly designated generally at 93. In corresponding manner, the lower sets of links 86',87' are pivotally secured by a transverse lower cross pin 88' to pairs of lower lever arms 89',90' also journalled at their proximal ends to sleeve portions 91,91', whereby both the upper and lower lever arms 89,90 and 89',90' are swingable about the axis of rotation of sleeve assembly 93.

Sleeve 92 is constituted by a tubular member which extends beyond the outer extremities of side rails 71,71' and carries at a location centrally between said side rails a toothed wheel 94 similar to previous embodiments and against the periphery of which a pair of pawls are adapted to bear, as more fully developed hereinbelow. Sleeve 92 and lever arms 89,89' and 90,90' are spacedly maintained against shifting laterally relative to side rails 71,71' by spacer rings 95,96 carried on opposite sides of sleeve means 92, as well as a ring 97 which is rotatable about sleeve means 92 and which carries a sprocket 97' for purposes soon to be apparent. The opposite ends of sleeve means 92 are journalled within side rails 71,71'. One extremity of sleeve means 102' extends through an aperture in side rail 71 and has affixed thereto a gear wheel 101 constituting one of a plurality of gear wheels of a transmission designated generally at 102. Such transmission may be noted as being a desirable optional feature of the apparatus, its specific features in use being matters described hereinbelow, but briefly being noted as adapted for selectively providing either normal or high speed of rotation of cross shaft 56 during operation of unit B.

Sleeve 102 is dimensioned for providing a bore having an inner diameter which is only slightly greater than the bore of cross shaft 56 whereby the latter may be received axially within the sleeve assembly as depicted in FIG. 11 with the cross shaft intact and without requiring the same to be broken, sectioned, or otherwise altered in any way which would preclude its normal use.

Frame F' also includes a plate 104 extending normally outwardly from side rail 71, being welded thereto, and thence bends forwardly to provide a portion 104' which extends forwardly in parallel, planar relationship to side rails 71,71'. Extending across the forward ends of each of members 104', 71 and 71' is an end piece or plate 105 which is bolted to plate 104' and side rail 71' as indicated at 106 for rigidifying the frame structure and enclosing the forward end of the frame F'. A lightweight bracket 106 extends rearwardly from plate member 104' and is thence directed toward side rail 71 and welded thereto, such bracket being utilized for guiding and supporting extensions of controls 68 and 69.

The transmission 102 comprises a transfer shaft 107 spaced from and parallel to the axis of sleeve assembly 103 having opposite ends journalled in side rail 71 and plate 104'. This transfer has a pinion 108 affixed at one end thereof for meshing with gear wheel 101. At the other end of the shaft is affixed a gear wheel 109. Adapted to mesh with this gear wheel is a pinion 110 carried by a coupling sleeve 111, said sleeve being adapted to be affixed to cross shaft 56 by means of keys 112 secured by a bolt 113, said keys fitting within a slotted keyway 113 in sleeve 111. As will be apparent, plate 104' is apertured in aligned relationship and coaxially with bore 103 of sleeve 102. A collar 114 is affixed to cross shaft 56 as by means of a set screw or the like adjacent plate 104'. A corresponding collar 114' may be affixed to cross shaft 56 adjacent side rail 91'.

Coupling sleeve 111 is provided with key-like projections 115 on one end thereof which are adapted to fit into corresponding keyways or slots 115' presented on the outer face of gear wheel 101. Thus, in the position shown, coupling sleeve 111 is adapted to be effectively keyed to gear wheel 101 and thereby maintained in fixed rotational relationship with respect to sleeve assembly 93 for being directly rotated in response to rotation of sleeve assembly for causing rotation of cross shaft 56. However, as will be apparent, said coupling sleeve 111 by virtue of keyway 113 is free to be moved from the position shown in FIG. 11 to the position shown in FIG. 13 with pinion 110 meshing instead with gear wheel 109. For this purpose, coupling sleeve 111 is provided with a peripheral annular channel or groove 116 (see also FIG. 13) in which a shifting yoke 117 is adapted to extend for movement of the coupling sleeve 111 in the direction indicated by an arrow 118 in FIG. 13.

Yoke 117 is carried on the end of an extension 69' of shifting handle or control 69. An arm 120 pivotally secured as at 121 to plate 104' has a distal end 122 for bearing against the lower side of the yoke with resilient pressure maintained thereagainst by a tension spring 123 extending between an upper edge of plate 104' and the arm. Such finger 122 may be notched or serrated whereby it will tend to cause yoke 117 to be maintained at a fixed position, while permitting the same to be relocated upon movement of handle 69. Control extension 69' to plate 104 whereby yoke 117 will be shifted along the axis of cross shaft 56 in response to pushing or pulling of handle 69. Thus, such control may be used to select a normal speed with coupling sleeve 111 keyed to gear wheel 101 or a high speed with pinion 110 meshing with gear wheel 109, or a neutral position wherein cross shaft 56 is effectively no longer coupled to unit B.

Referring now to FIGS. 16–19, cross shaft 56 is shown passing through the bore 103 of the sleeve assembly 102 being free to rotate relative to cross shaft 56 except when coupling sleeve 111 (FIG. 11) is keyed to gear wheel 101. Toothed wheel 94 in effect provides a ratchet wheel by virtue of its toothed configuration. Mounted pivotally on upper and lower pawl pivot shafts 127,127' are the previously mentioned upper and lower pawls 128,128', the latter being respectively secured to such shafts 127,127' and the latter shafts being journalled for rotation in the corresponding upper and lower pairs of lever arms 89,89' and 90,90'. The bodies of pawls 128,128' include respective central upraised shoulders or apeces 129,129' on either side of which depend fingers 130,130' and 131,131' adapted to extend into interdental zones developed by the teeth 94' of gear wheel 94. Thus, each pawl is separately engageable, by rocking about the axis of the respective pivot shafts 127,127', with the toothed outer periphery of gear wheel 94 in spaced apart zones.

Secured to cross shafts 88,88' by being welded thereto are respective flat, stiff strips 133,133'. Spaced from and loosely secured to these strips by rivet head pins 134a,134b and 134a' and 134b' are respective flat, stiff strips 135,135' adapted to bear against the respective shoulders 129,129' of the pawls. Compression springs 136a,136b and 136a',136b' resiliently bias the latter strips against said shoulders to maintain the respective pawls 128,128' in overcentered relationship corresponding to a desired direction of rotation of sleeve means 102.

As in a previous embodiment, pawls 128,128' will remain in either of two configurations for continuously urging gear wheel 94 in a selected direction of rotation upon reciprocation of actuation rod 78, with the respective sets of lever arms 86,86' and 87,87' converging and diverging as shown sequentially in FIGS. 16–19 with each stroke of actuation rod 78 producing further rotation of sleeve means 102. Cross shaft 56 is rotated by the latter either at the same angular velocity or, if transmission control 69 is moved to the position shown in FIG. 13, at an increased angular velocity, as during such times as the landing gear legs 53,53' are out of contact with the ground and are unladen.

Each of pawls 128,128' is, as noted, selectively shiftable through overcentering movement from the position shown (as in FIGS. 16–19) to an alternate position for causing opposite rotation of coupling sleeve means 102 to be rotated in the opposite with each stroke of reciprocation of rod 78. For this purpose, each of said pawl pivot shafts 127,127' extends through one of the lever arms 90,90' and carries respective pawl shifting members 137,137' thereon, the latter each having corresponding pairs 138,138' of fingers extending generally toward sleeve means 102 and defining between them recesses 139,139'. Spacedly affixed to collar or ring member 97 are a pair of rib-like fingers or extensions 140,140' which are adapted to be received within corresponding recesses 139,139' of the pawl shifting members 137,137'. Accordingly, upon rotation of collar or ring member 97, said extensions 139,139' will cause rocking of the shifting members 137,137' for movement of each of the pawls 128,128' to their alternate positions.

Figure 15:
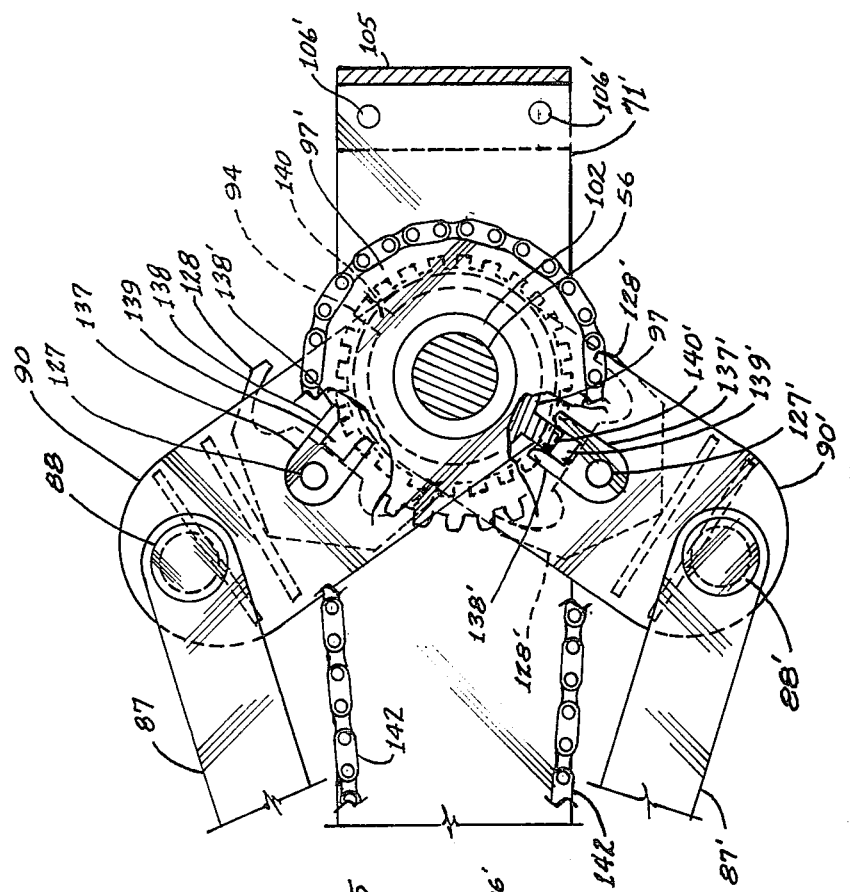
FIG. 15 is a similar vertical longitudinal sectional view, taken along the same line as FIG. 14, illustrating actuation of certain pawls of the apparatus for direction control purposes.
Figure 14:
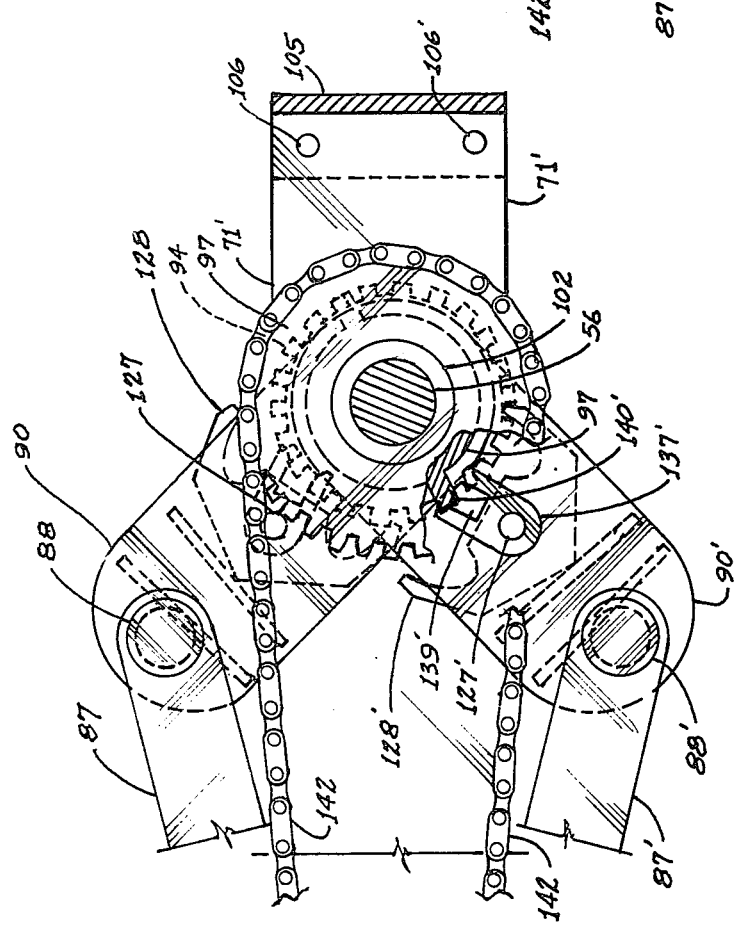
FIG. 14 is a vertical longitudinal sectional view taken along line 14—14 of FIG. 11.
Figure 16:
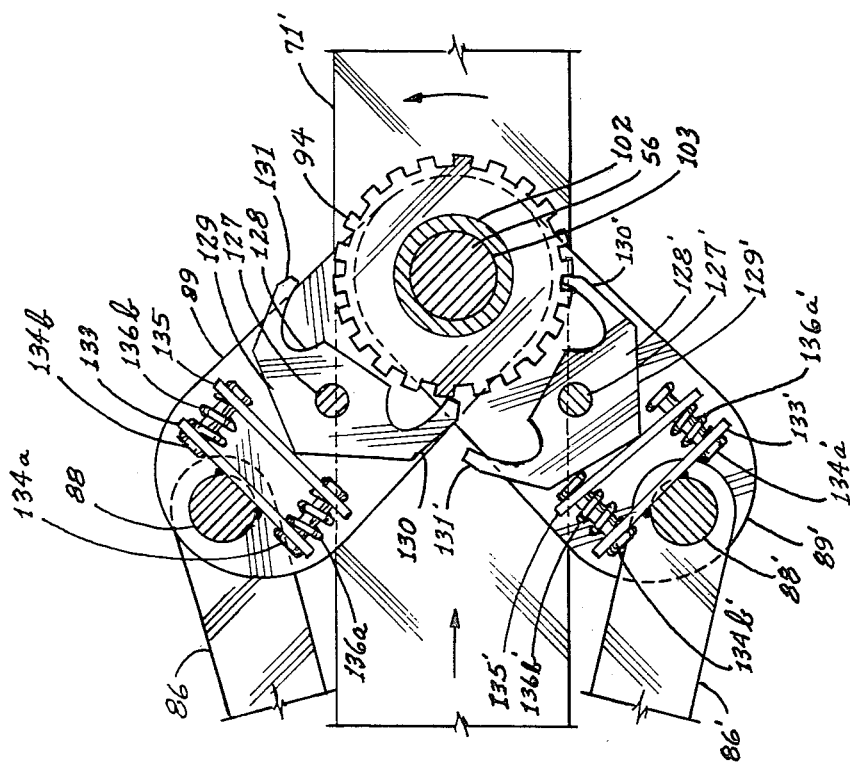
FIG. 16 is a vertical longitudinal sectional view taken along line 16—16 of FIG. 11, illustrating certain actuating components of the apparatus.
Figure 17:
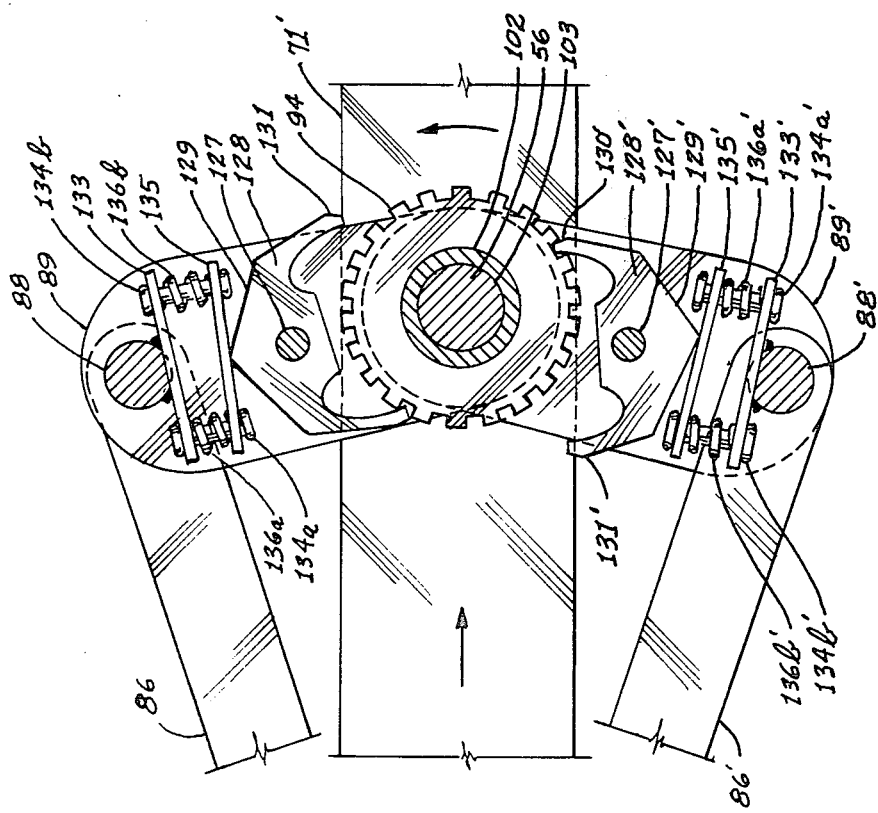
FIG. 17 is a similar vertical longitudinal sectional view taken along the same line as FIG. 16, illustrating further actuation of the apparatus.
Figure 18:
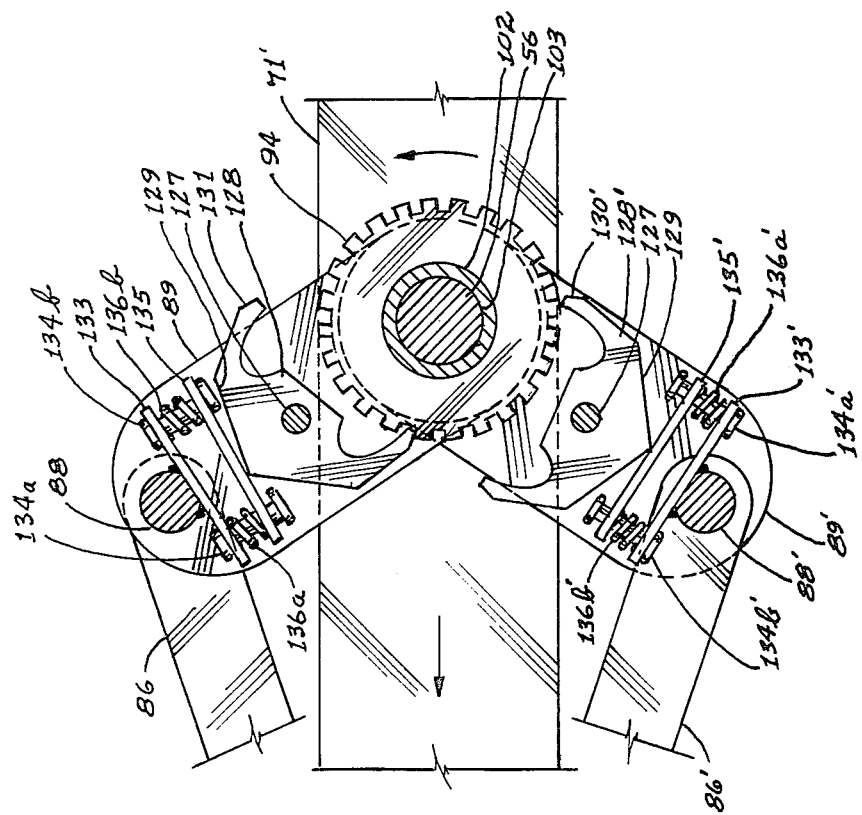
FIG. 18 is a similar vertical longitudinal sectional view illustrating further movement of the components shown in FIGS. 16 and 17.

Sprocket 97' previously noted as carried upon collar 97 is remotely actuated for this purpose by means of a chain belt 142 extending around sprocket 97' and around a further sprocket 143 carried by a shaft-like extension 144 of direction control lever 68, said shaft 144 being journalled in side rail 71. Accordingly, rotation of handle 68 about the axis of shaft 144 will cause rotation of shifting ring or collar 97 to selectively overcenter each of the pawls 128,128' in the manner depicted sequentially in FIGS. 14 and 15. Thus, in FIG. 14 it will be seen that finger 149' carried by the shifting ring 97 is entering recess 139' and by bearing against the fingers 138' which define said recess 139' will cause rotation of pawl pivot shaft 127' as shown in FIG. 15. Further movement of finger 140' carries shaft 127' through its full extent of rotation with pawl 128' moving to its alternate position. Similarly, pawl shifting member 137 will be rotated about the axis of pawl pivot shaft 127 when contacted by finger 140 for causing pawl 128 to be moved to its alternate position.

Figure 13:
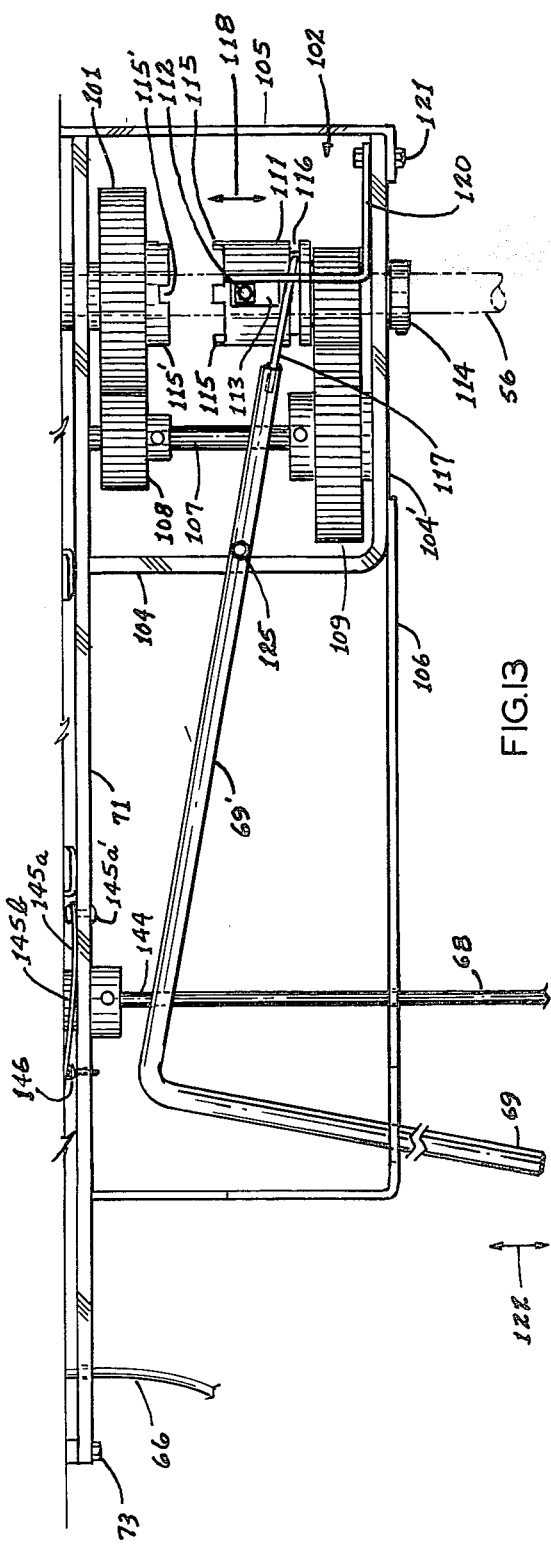
FIG. 13 is a fragmentary top plan view of transmission portions of the apparatus of FIG. 11.

Referring to FIGS. 12 and 13, sprocket 143 to which direction control shaft 144 is attached may be retained in its selected position by means of an arm 145a pivoted at 145a' to the inner surface of side rail 71 for bearing against a flatted portion 145b of a collar of sprocket 143 and with said arm being resiliently biased against said flatted portion by a tension spring 146. Oppositely disposed flatted portions are preferred whereby sprocket is maintained in a desired one of either of two positions corresponding to the desired up or down movement of the landing gear legs 53,53'.

Figure 20:
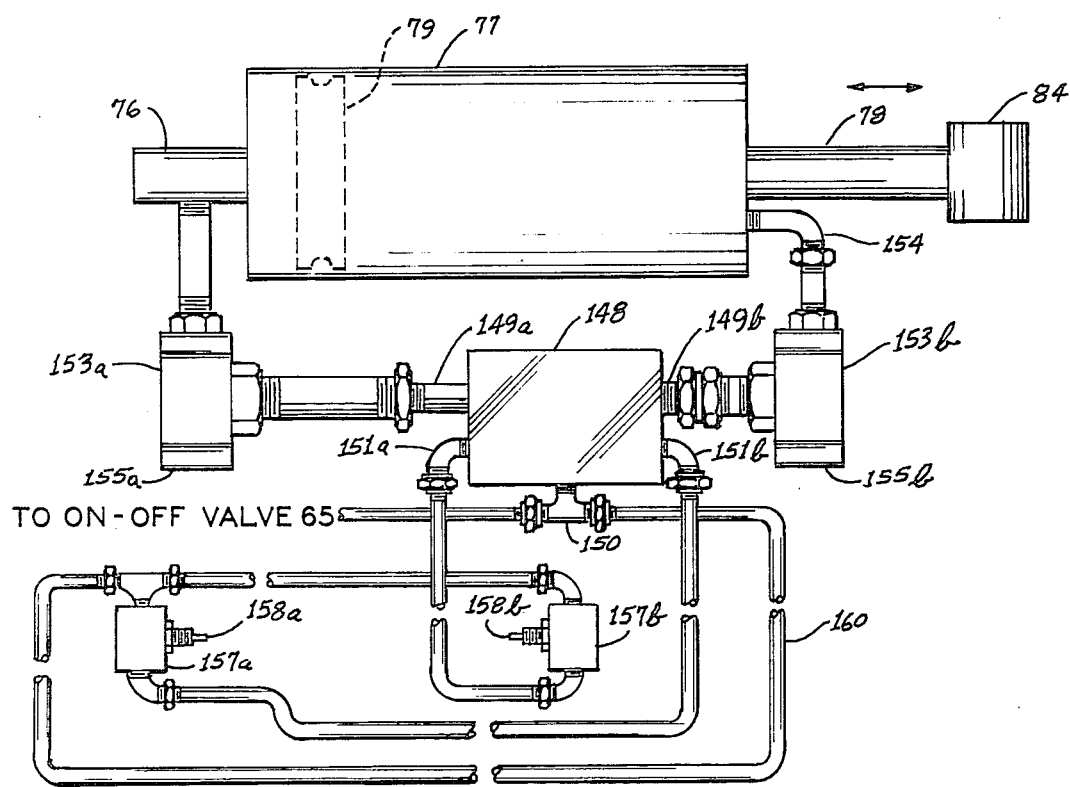
FIG. 20 is a pictorial representation of pneumatic control elements of the new system.

Referring now to FIGS. 11, 12, and 20, pneumatic control elements of the new landing gear actuating embodiment of the invention are seen to include an air-operated master valve 148 having a pair of output ports 149a,149b adapted for alternately providing air pressure from a source of such pressure provided to an input port 150 from the remotely located on-off control valve 65 (see FIG. 8), which preferably is of the spring return type for returning automatically to the off position when pressure on handle 67 is released. The master valve includes a pair of control ports 151a,151b for alternately receiving control air pressure, it being understood that said master valve 148 will alternately supply air at one of the output ports 149a,149b in response to control air pressure provided to a corresponding one of input ports 151a,151b.

Output ports 149a,149b are connected through respective quick exhaust check valves 153a,153b to the opposite ends of pneumatic cylinder 77, it being apparent that cylinder extension 76 provides the air to the pneumatic cylinder on one side of piston 79 and valve 153b provides air through an elbow 154 to the interior of the pneumatic cylinder on the other side of piston 79, said elbow being threaded into a front face of the pneumatic cylinder adjacent actuating rod 78. Each of these known types of quick exhaust check valves is adapted to permit air pressure to flow into the cylinder but to exhaust such air upon reverse air pressure through respective exhaust ports 155a,155b.

A pair of pilot or control valves 157a,157b are located at the opposite ends of guide 81' (see FIG. 11) and have respective actuators 158a,158b adapted to be contacted by roller guide 82' as the actuating rod 78 of the apparatus approaches the end of its stroke. As is apparent, each of pilot valves 157a,157b is provided with air from conduit 66 by means of a conduit 160 whereby they will alternately provide control air to the control input ports 151a,151b of master valve 148, which is of known commercial type. Therefore, so long as vehicular air pressure is made available by conduit 66, the pneumatic control components will alternately supply air to the opposite ends of pneumatic cylinder 77 for causing reciprocating movement of actuator rod 78 toward and away from sleeve assembly 103 in axially normal relationship thereto.

Referring now to FIG. 12, the manner in which unit B is enclosed is illustrated by depicting in phantom the outline of upper and lower covers 161,161', respectively, which may simply be clipped in place as by means of spring clips of the commercially available type depicted at 168 in FIG. 8, to the frame F' which in part encloses the operating elements of the unit. Since frame F' provides the requisite strength and structural rigidity for supporting pneumatic cylinder 77 and the other elements of the mechanism relative to cross shaft 56, upper and lower covers 161,161' may be of lightweight resinous material, such as an inexpensive thermoplastic, of sufficient strength and integrity to keep dirt and moisture from entering the unit. Covers 161,161' together with frame F' define the enclosure 60 of the new unit.

For purposes of installing the unit upon a truck trailer, it is a simple expedient to first loosen the cross shaft 56 of the trailer at one end from one of the landing gear units. Thereupon, the sleeve assembly of the unit will receive one end of the cross shaft and thus the unit is conveniently slid into place and the cross shaft again reaffixed to the landing gear leg unit from which it previously was detached. Said cross shaft is drilled to permit insertion of bolt 113 which is then installed to retain key members 112. The opposite end of enclosure 5 66 is then attached in the manner depicted representatively in FIG. 8 by bolting one end of a bracket or brace 61 to frame member 66 and by affixing the opposite end of said brace to a structural member 63 of the floor of the trailer. The on-off control valve 65 is then attached and conduit 66 fitted thereto. Further, a conduit is connected between valve 65 and a source of vehicular air pressure, such as the emergency brake line of the trailer. Installation is thus made in a most efficacious, facile manner without requiring the use of more than simple mechanical skills and in very little time indeed.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be obtained by Letters Patent is:

1. For use with a truck trailer, a motion transmission system for operating a truck trailer landing gear mechanism having a pair of landing gear legs and a transverse shaft rotatable in one direction or the other for respectively extending or retracting said legs, said system comprising an enclosure adapted for being carried by said trailer, sleeve means journalled within said enclosure for receiving said shaft in intact condition, means for coupling said sleeve means to said shaft for causing rotation of said shaft by said sleeve means, a pneumatic cylinder, a piston within said cylinder, an actuator rod extending from said cylinder within said enclosure axially normal to said sleeve means and reciprocal axially along a rectilinear path toward and away from said sleeve means, a toothed wheel for rotating said sleeve means and carried concentrically by said sleeve means within said enclosure, first and second sets of lever arms within said enclosure having proximal ends journalled in upper and lower pairs on opposite sides of said toothed wheel and distal ends radially spaced from the axis of rotation of said sleeve means, first and second pairs of links pivotally interengaging the cylinder remote end of said actuator rod and the respective upper and lower pairs of lever arms within said enclosure, first and second pawls located respectively between the upper and lower pairs of lever arms proximate the periphery of said toothed wheel for engaging said toothed wheel responsive to the direction of movement of said actuator rod, means interengaging the upper pair of lever arms for swingably mounting said first pawl, means interengaging the lower pair of lever arms for swingably mounting said second pawl, said pawls being presented to engage said toothed wheel in spaced-apart zones, each pawl having a body, a shoulder centrally of said body and depending fingers projecting from opposite sides of said body and directed toward the periphery of said toothed wheel, resilient means associated with each pawl for resiliently bearing against the respective shoulder for maintaining the pawl in selected forward or reverse overcentered relationship with a corresponding depending finger of the pawl engaging an interdental zone of said toothed wheel to impart rotational force to said toothed wheel, in a selected continuous forward or reverse direction, in response to each movement of said actuator rod, and means for remotely and selectively shifting the overcentered relationship of each pawl for selectively controlling the direction of rotation of said shaft.

2. A motion transmission system for operating a landing gear system of a truck trailer, said landing gear system having separate landing gear legs interconnected by a single shaft and each landing gear leg being retractible and extensible in response to rotation of said shaft in one direction or the other, said system comprising sleeve means for receiving said shaft, means for coupling said sleeve means to said shaft, a pneumatic cylinder, an actuator rod extending from said cylinder axially normal to said sleeve means and reciprocal toward and away from said sleeve means, first and second lever arms having proximal ends swingable about said sleeve means, first and second links respectively interconnecting distal ends of said first and second lever arms with said rod, a toothed wheel carried by said sleeve means, and selectively reversible pawl means carried by each of said lever arms for engaging teeth of said toothed wheel to cause rotation of said sleeve means for rotating said shaft in a selected continuous direction with each movement of said rod, an elongated housing for enclosing said sleeve means, said pneumatic cylinder, actuator rod, lever arms, links, pawl means and toothed wheel, said housing being apertured proximate one end thereof for receiving said shaft intact for supporting said system at one end of said housing with said shaft extending transversely from opposite sides of said housing, and a brace at the other end of said housing for securement to floor structure of said trailer for suspending the other end of said housing from said floor structure, said means for coupling said sleeve means to said shaft comprising transmission gears for selectively causing said shaft to rotate at greater angular velocity than said sleeve means.

3. A motion transmission system for operating a vehicular jacking mechanism having at least one jacking member and a shaft rotatable for actuating said member, said system comprising sleeve means for receiving said shaft, means for coupling said sleeve means to said shaft, a pneumatic cylinder, an actuator rod extending from said cylinder axially normal to said sleeve means and reciprocal toward and away from said sleeve means, first and second lever arms having proximal ends swingable about said sleeve means, first and second links respectively interconnecting distal ends of said first and second lever arms with said rod, a toothed wheel carried by said sleeve means, and selectively reversible pawl means carried by each of said lever arms for engaging teeth of said toothed wheel to cause rotation of said sleeve means for rotating said shaft in a selected continuous direction with each movement of said rod, said means for coupling said sleeve means to said shaft comprising transmission gears for selectively causing said shaft to rotate at greater angular velocity than said sleeve means, said sleeve means comprising a sleeve member coaxial with said shaft and journaled for rotation relative to said shaft, said transmission gears comprising a first gear wheel carried by said sleeve member, a rotatable transfer shaft, a first pinion affixed to said transfer shaft for being engaged by said first gear wheel, a second gear wheel affixed to said transfer shaft, a second pinion concentric with said shaft adapted for being driven by said second gear wheel, and a coupling member for coupling said second pinion to said shaft.

4. A motion transmission system according to claim 3, said coupling member comprising a further sleeve selectively axially shiftable on said shaft, said second pinion being affixed to said shiftable sleeve for shifting movement with said shiftable sleeve into and out of engagement with said second gear wheel, and means for keying said shiftable sleeve to said shaft for imparting rotation to said shaft.

5. A motion transmission system according to claim 4, said shiftable sleeve being adapted for movement between a first position engaging said sleeve member for being directly driven thereby and a second position moving said second pinion into engagement with said second gear wheel for being indirectly driven by said sleeve member at greater angular velocity than said sleeve member, and an actuator for selectively shifting said shiftable sleeve between said first and second positions.

6. A motion transmission system for operating a vehicular jacking mechanism having at least one jacking member and a shaft rotatable for actuating said member, said system comprising sleeve means for receiving said shaft, means for coupling said sleeve means to said shaft, a pneumatic cylinder, an actuator rod extending from said cylinder axially normal to said sleeve means and reciprocal toward and away from said sleeve means, first and second lever arms having proximal ends swingable about said sleeve means, first and second links respectively interconnecting distal ends of said first and second lever arms with said rod, a toothed wheel carried by said sleeve means, and selectively reversible pawl means carried by each of said lever arms for engaging teeth of said toothed wheel to cause rotation of said sleeve means for rotating said shaft in a selected continuous direction with each movement of said rod, said pawl means each being selectively shiftable between first and second positions for selectively controlling the direction of rotation of said shaft, and means for remotely shifting said pawl means between said first and second positions.

7. A motion transmission system according to claim 6, said pawl means each comprising a pawl body, means swingably mounting each pawl body to a respective one of said arms, each of said pawl bodies comprising a central shoulder and depending fingers projecting from opposite sides of the body, resilient means carried by each of said arms for resiliently bearing against the respective shoulder in selectively overcentering relationship for selectively urging a depending finger of the respective pawl toward teeth of said toothed wheel for engaging an interdental zone thereof, said means for remotely shifting said pawl means providing selective overcentering of each said pawl body.

8. A motion transmission system according to claim 7, each said pawl body carrying said means for remotely shifting said pawl means comprising a pawl body shifting ring member journalled concentrically with said sleeve means for selective rotation about said sleeve means in selective opposite directions, means extending from each pawl body and disposed relative to said sleeve means for being contacted by said ring upon rotation thereof to cause overcentering shifting of the respective pawl.

9. A motion transmission system according to claim 8, said ring being connected to a first sprocket concentric with said sleeve, a second sprocket rotatable about an axis parallel with and spaced from the axis of rotation of said sleeve means, a chain belt interconnecting said sprockets, and a shaft connected to said second sprocket for causing selective rotation thereof.

* * * * *